(12) United States Patent
Hacikyan

(10) Patent No.: US 8,616,432 B1
(45) Date of Patent: Dec. 31, 2013

(54) WELDING PURGE DAM FOR HIGH AIR FLOW ENVIRONMENT

(76) Inventor: Michael Hacikyan, Amherst, NY (US)

( * ) Notice: Subject to any disclaimer, the term of this patent is extended or adjusted under 35 U.S.C. 154(b) by 0 days.

(21) Appl. No.: 13/562,483

(22) Filed: Jul. 31, 2012

(51) Int. Cl.
 *B23K 31/02* (2006.01)
 *B32B 3/02* (2006.01)
 *F16L 55/11* (2006.01)

(52) U.S. Cl.
 USPC .............. 228/42; 228/219; 138/89; 428/66.3

(58) Field of Classification Search
 None
 See application file for complete search history.

(56) References Cited

U.S. PATENT DOCUMENTS

| | | | | |
|---|---|---|---|---|
| 3,095,844 A | * | 7/1963 | Thielsch | 137/561 R |
| 3,338,499 A | * | 8/1967 | Gilbert | 228/57 |
| 3,431,166 A | * | 3/1969 | Ishibashi et al. | 162/135 |
| 3,736,400 A | * | 5/1973 | Spiegel et al. | 219/60 A |
| 4,096,372 A | | 6/1978 | Hallenbeck | |
| 4,101,067 A | * | 7/1978 | Sloan et al. | 228/222 |
| 4,114,655 A | * | 9/1978 | Bloker | 138/89 |
| 4,415,114 A | | 11/1983 | Hallenbeck | |
| 4,674,772 A | * | 6/1987 | Lycan | 285/22 |
| 4,875,615 A | * | 10/1989 | Savard | 228/119 |
| 4,916,281 A | | 4/1990 | Flasche et al. | |
| 5,100,043 A | | 3/1992 | Hallenbeck | |
| 5,187,343 A | * | 2/1993 | Edwards | 219/74 |
| 5,361,972 A | * | 11/1994 | Barker | 228/219 |
| 5,390,846 A | * | 2/1995 | Thode | 228/219 |
| 5,583,305 A | * | 12/1996 | Hirsch et al. | 73/865.8 |
| 5,669,547 A | * | 9/1997 | Spring | 228/219 |
| 5,785,235 A | * | 7/1998 | Beatty | 228/42 |
| 6,299,607 B1 | * | 10/2001 | Osborn et al. | 604/385.02 |
| 7,112,258 B2 | * | 9/2006 | Klerelid et al. | 162/109 |
| 7,112,358 B1 | | 9/2006 | Hacikyan | |
| 7,632,556 B1 | | 12/2009 | Hacikyan | |
| 8,061,388 B1 | * | 11/2011 | O'Brien et al. | 138/89 |
| 8,292,161 B2 | * | 10/2012 | Hacikyan | 228/212 |
| 2004/0022676 A1 | | 2/2004 | Hamilton et al. | |
| 2005/0072809 A1 | | 4/2005 | Pantelleria et al. | |
| 2006/0068142 A1 | * | 3/2006 | Hacikyan | 428/40.1 |
| 2008/0251132 A1 | | 10/2008 | Bentley et al. | |
| 2011/0151166 A1 | * | 6/2011 | Hacikyan | 428/40.1 |
| 2011/0210112 A1 | * | 9/2011 | Boatner, Jr. | 219/158 |

FOREIGN PATENT DOCUMENTS

GB 2201623 A * 9/1988
GB 2288562 A * 10/1995

(Continued)

OTHER PUBLICATIONS

Arczone.com, "Purge Bladders Save Time and Money", 2006, 2 pages.

(Continued)

*Primary Examiner* — Kiley Stoner
(74) *Attorney, Agent, or Firm* — Walter W. Duft

(57) ABSTRACT

A water-degradable purge dam apparatus for purging a weld zone of a pipe assembly comprising first and second pipes having respective first and second ends. A first purge dam subassembly adapted for installation in the first pipe end has a hollow first conduit defining a first air flow pathway. A second purge dam subassembly adapted for installation in the second pipe end has a hollow second conduit defining a second air flow pathway. Each subassembly has one or more air flow blocking plates. A hollow third conduit, defining a third air flow pathway, is interconnectable to the first and second conduits members to span the weld zone. The first, second and third air flow pathways allow pressurized air within the pipes to pass through the purge dam apparatus and the weld zone in a sequestered by-pass zone defined by the first, second and third conduits.

22 Claims, 9 Drawing Sheets

(56) References Cited

FOREIGN PATENT DOCUMENTS

| | | | | |
|---|---|---|---|---|
| GB | 2327480 | A | * | 1/1999 |
| JP | 05-245633 | A | * | 9/1993 |
| JP | 06-23685 | | | 3/1994 |
| JP | 09-010933 | A | * | 1/1997 |
| JP | 2003-266176 | A | * | 9/2003 |
| JP | 2004-105994 | A | * | 4/2004 |
| JP | 2010-149164 | A | * | 7/2010 |
| KR | 20-0159923 | | | 11/1999 |
| KR | 20-0179895 | | | 4/2000 |

OTHER PUBLICATIONS

Weldwide Solutions, "Tandem Ring Purge System", at least as early as Apr. 27, 2012, 3 pages.
Huntingdon Fusion Technologies Limited, "Argweld Inflatable Pipe Purging System", Jan. 12, 2008, 2 pages.
Huntingdon Fusion Technologies Limited, "Argweld Single Exhaust Pipe Weld Purging Systems 2-6 Inch Pipework", Mar. 15, 2011, 2 pages.
Sumner Manufacturing Co., Inc., "Inflatable Weld Purge System", at least as early as Apr. 27, 2012, 2 pages.
Weldwide Solutions, "Inflatable Purge Systems", at least as early as Jan. 16, 2012, 4 pages.
Safety Main Stopper Co., Inc., "Inflatable Purge Dams", at least as early as Jan. 16, 2012, 2 pages.
Aquasol Corporation, "Purge Bladder: I-Purge Inflatable Purge Dam System", 2010, 6 pages.
AB Paper Co., "Shur-Purge", Jan. 1, 1997, 5 pages.
Intercon, "Water-Soluble Purge Paper", Oct. 1, 2002, 5 pages.
Gilbreth, "Dissolvo", 2001, 8 pages.

* cited by examiner

WELDING PURGE DAM FOR HIGH AIR FLOW ENVIRONMENT

BACKGROUND

1. Field

The present disclosure relates generally to inert gas welding. More particularly, the invention is directed to purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe on either side of the weld zone. A purge gas can then be introduced into the area between the dams.

Water degradable purge dams have been proposed that are made from water degradable paper. The advantage of water degradable paper purge dams is that they can be placed in close proximity to a weld zone, and then removed following welding by dissolving or otherwise degrading them with water introduced through the pipe. Insofar as pipe systems typically undergo hydrostatic pressure testing or flushing with water prior to use, water soluble purge paper can be used in many cases without any additional processing steps following welding. Such purge dams are typically formed from a sheet of water degradable paper that is formed into a concave shape in which a central portion of the purge dam spans across the diameter to the pipe to be welded and a peripheral edge portion of the purge dam engages the pipe wall so that it can be secured thereto, such as by using water soluble tape.

Conventional water degradable purge dam devices as described above are designed for use with pipe installations with little or no air flow within the pipes being welded. However, there are high air flow environments in which conventional water degradable purge dams are not practical because the purge dams cannot withstand the air pressure fluctuations within the pipes. For example, underwater pipelines that are miles in length can develop large bidirectional air pressure surges. Undersea pipeline installation contractors sometimes refer to this phenomenon as "suck and blow." When fabricating such pipelines, the end of the existing portion of the pipeline is located and pulled up to the surface by a pipe-lay vessel that carries the next run of pipe, which itself may be several miles in length, on a spool. Inert gas welding to connect the ends of the two pipe sections is performed onboard the ship using a welding jig that aligns the pipe sections to form a welding root gap. However, it is first necessary to ensure that the bidirectional air flow within the pipe sections cannot enter the weld zone, where it would quickly displace the purge gas. This is typically done by inserting blocking members, made from a suitable foam material, into the ends of the pipe sections. Unfortunately, this practice has met with mixed success because the blocking member can dislodge if the air pressure fluctuations are large enough, and may be difficult to remove following welding.

Applicants submit that there is presently a need for improvement in the construction of water-degradable purge dams for high air flow environments. What is required in particular is a purge dam apparatus that can be used in long pipelines that develop significant bidirectional air pressure fluctuations therein.

SUMMARY

A water-degradable welding purge dam apparatus for purging a weld zone of a pipe assembly comprising first and second pipes having respective first and second ends to be welded together at a root gap. A first purge dam subassembly has a hollow first conduit defining a first air flow pathway therethrough, and has one or more air flow blocking plates fixedly mounted on the first conduit. A second purge dam subassembly has a hollow second conduit defining a second air flow pathway therethrough, and has one or more air flow blocking plates fixedly mounted on the second conduit. A hollow third conduit, defining a third air flow pathway therethrough, is interconnectable to the first and second conduits members. The purge dam apparatus is installable in the pipe assembly such that (1) the first purge dam subassembly is arranged inside the first pipe end, the second purge dam subassembly is arranged inside the second pipe end, and the third conduit is interconnected to the first and second conduit and spans the root gap, (2) the one or more blocking plates of the first and second purge dam assemblies respectively engage inside walls of the first and second pipe ends in order to retain a purge gas in the weld zone and to prevent air from entering the weld zone from the first and second pipes, and (3) the first, second and third air flow pathways allow pressurized air within the pipes to pass through the purge dam apparatus and the weld zone in a sequestered by-pass zone defined by the first, second and third conduits. The purge dam apparatus comprises one or more water degradable materials so that the it can be flushed from the pipe assembly following welding.

In an embodiment, the one or more blocking plates may each comprise one or more generally circular disks having a central opening that receives one of the first or second conduits. One of the circular disks of each blocking plate may comprise a friction disk having a plurality of flexible members on its periphery adapted to flexibly engage an inside wall of one of the first or second pipe ends. In an embodiment, the flexible members may comprise flexible tabs defined by slits in the disk periphery. The one or more blocking plates additionally may include one or more support disks stacked on one or both sides of the friction disk. The one or more support disks may have a periphery that is aligned with a base of the friction disk flexible tabs.

In an embodiment, the first, second and third conduits are configured to allow a spacing between the first and second purge dam subassemblies to be adjusted following installation of the welding purge dam apparatus in the pipe assembly, thereby accommodating pipe end spacing adjustments. The first, second and third conduits may respectively comprise first, second and third tube members, with the third tube member being slidable within the first and second tube members.

In an embodiment, spacer members may be provided between the one or more blocking plates. The spacer members may comprise spacer conduits mounted on the first and second conduits. Support members may also be provided between the one or more blocking plates. The support members may comprise box members.

In an embodiment, the first and second subassemblies each have a primary blocking plate that includes an elongated sidewall member adapted to be adhered to an inside wall of one of the pipe ends.

In an embodiment, the first and second subassemblies each further include a floating blocking plate that is adjustably positionable on the first or second conduits.

In an embodiment, a heat shield may be provided to cover adjacent end portions of the first and second conduits when the purge dam apparatus is installed in the pipe assembly.

In additional embodiments, the first and second assemblies are independent assemblies that are not interconnected. The first and second assemblies do not have hollow conduits to pass air therethrough, and no air passes through the weld zone. This embodiment is suitable for use in pipe assemblies that have relatively low air pressures within the pipes.

In another aspect, a method for installing the purge dam apparatus, and a weld zone purging installation comprising the purge dam apparatus installed in a pipe assembly are provided.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
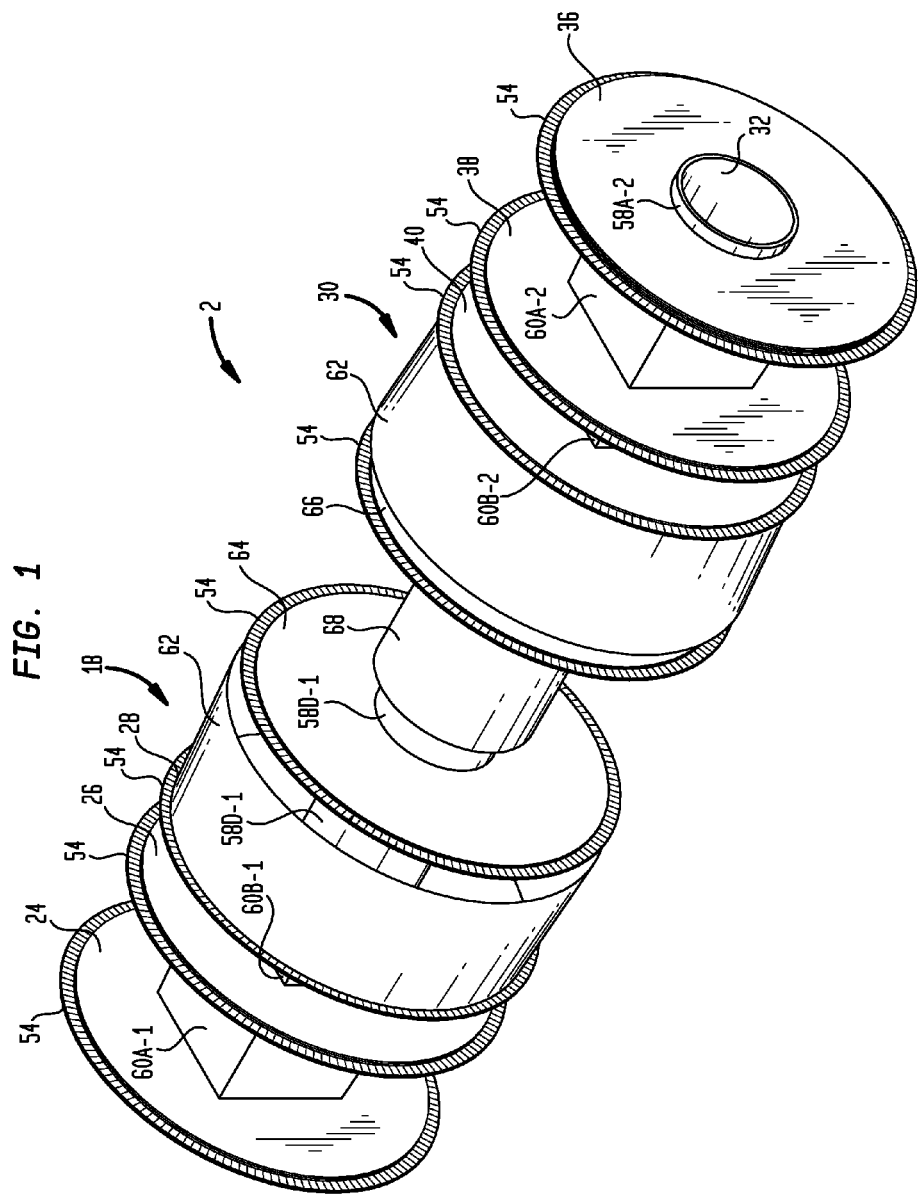
FIG. 1 is a perspective showing a water-degradable purge dam apparatus constructed in accordance an embodiment with the present disclosure.
Figure 2:
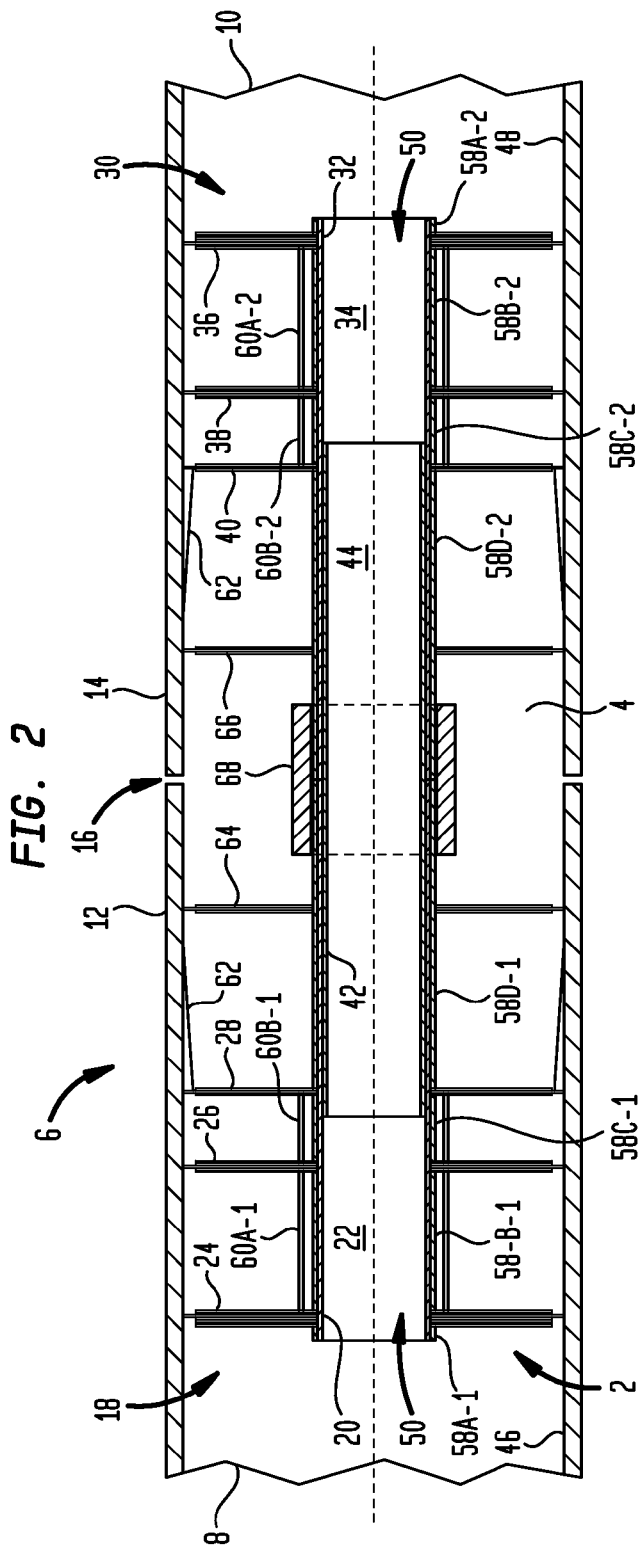
FIG. 2 is a cross-sectional centerline view the purge dam apparatus of FIG. 1 following installation in a pipe assembly.

Turning now to the drawing figures, which are not necessarily to scale, like reference numbers are used to represent like elements in all of the several views. FIGS. 1 and 2 illustrate an example water-degradable purge dam apparatus 2 representing one possible embodiment of the disclosed subject matter. As best shown in FIG. 2, the purge dam apparatus 2 is adapted for purging a weld zone 4 of a pipe assembly 6 comprising a first left-side pipe 8 and second right-side pipe 10. The first and second pipes 8 and 10 have respective first and second pipe ends 12 and 14 to be butt-welded together at a root gap 16. All structural components of the purge dam apparatus 2 are made from water degradable materials. A variety of water degradable materials may be used. However, the water degradable materials will be preferably designed to (1) provide low (or zero) air permeability for critical welding applications, (2) provide sufficient strength to withstand both purge gas pressure and bidirectional air flow pressures within the pipes 8 and 10, (3) allow the purge dam components to be easily formed and manipulated from flat sheet stock into their final shapes, and (4) degrade under hydrostatic pressure testing or flushing of the pipe structure with water or other aqueous liquids to facilitate purge dam removal following welding.

Example water degradable materials include, but are not limited to, water degradable paper or board, a water degradable polymer, or a combination of water degradable paper or board and a water degradable polymer. Suitable water degradable paper and board materials are available from Aquasol Corporation of North Tonawanda, N.Y. under the trademark Aquasol®. The Aquasol® brand paper and board products are water soluble and made of Sodium Carboxy Methyl cellulose and wooden pulp that dissolves rapidly and completely in most liquids, including water. A suitable water degradable polymer is polyvinyl alcohol (PVOH), which may be manufactured in film form or as a molded three-dimensional structure. Regardless of whether the water degradable material is paper board, polymer, or a combination of such materials, one or more layers of the selected material may be fabricated into water degradable sheets of varying thickness. The sheet thicknesses may be selected according to the strength and flexibility requirements of the various structural components of the purge dam apparatus 2. The water degradable sheets may cut into any desired shape (prior to or after lamination) that is useful for purge dam formation, including but not limited to tubular shapes and circular shapes, as will now be described. A suitable water degradable adhesive may be used to combine the structural components of the purge dam apparatus 2.

As can seen in FIGS. 1 and 2, a first purge dam subassembly 18 on the left side of the purge dam apparatus 2 has a first (left-hand) conduit 20 that is hollow to define a first air flow pathway 22 therethrough. The first purge dam subassembly 18 also has one or more air flow blocking plates fixedly mounted thereon. In the embodiment of FIGS. 1 and 2, there are three fixed blocking plates 24, 26 and 28 mounted on the first conduit 20 in a first ganged arrangement. A second purge dam subassembly 30 on the right side of the purge dam apparatus 2 has a second (right-hand) conduit 32 that is hollow to define a second air flow pathway 34 therethrough. The second conduit 32 also has one or more air flow blocking plates fixedly mounted thereon. In the embodiment of FIGS. 1 and 2, there are three fixed blocking plates 36, 38 and 40 mounted on the second conduit 32 in a second ganged arrangement. A third (central) conduit 42 spans the center of the purge dam apparatus 2, and is hollow to define a third air flow pathway 44 therethrough. The third conduit 42 is interconnectable to the first and second conduits, and in FIG. 2, is shown in a fully interconnected configuration.

The purge dam apparatus 2 is installable in the pipe assembly 6 to establish a weld zone purging installation as shown in FIG. 2. As can be seen, the first purge dam subassembly 18 is arranged inside the first pipe end 12 of the first pipe 8, the second purge dam subassembly 30 is arranged inside the second pipe end 14 of the second pipe 10, and the third conduit 42 is interconnected to the first and second conduits 20 and 32 so as to span the root gap 16. The fixed blocking plates 24-28 and 36-40 of the first and second purge dam assemblies 18 and 30 respectively engage inside walls 46 and 48 of the first and second pipe ends 12 and 14 in order to retain a purge gas (not shown) in the weld zone 4, and to prevent air from entering the weld zone from the first and second pipes 8 and 10. On the other hand, the first, second and third air flow pathways 22, 34 and 44 allow pressurized air within the pipes 8 and 10 to pass through the purge dam apparatus 2, and across the weld zone 4, in a sequestered by-pass zone 50 defined by the first, second and third conduits 20, 32 and 42.

Figure 3:
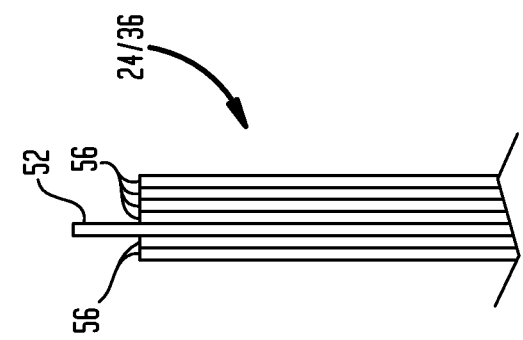
FIG. 3 is an enlarged fragmentary side view showing a first example blocking plate of the purge dam apparatus of FIG. 1.
Figure 4:
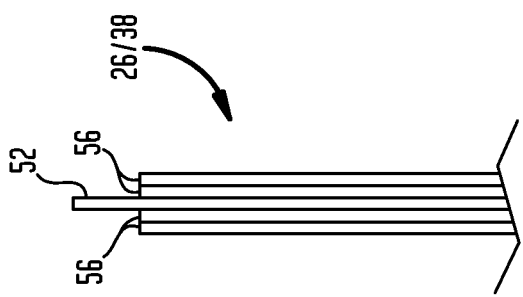
FIG. 4 is an enlarged fragmentary side view showing a second example blocking plate of the purge dam apparatus of FIG. 1.
Figure 5:
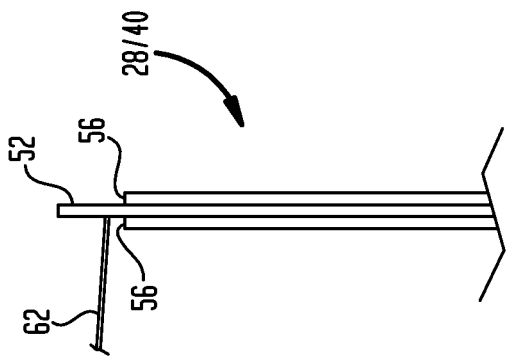
FIG. 5 is an enlarged fragmentary side view showing a third example blocking plate of the purge dam apparatus of FIG. 1.

In the illustrated embodiment of FIGS. 1 and 2, the fixed blocking plates 24-28 and 36-40 each comprise one or more generally circular disks having a central opening that receives one of the first or second conduits 20 or 32. The fixed blocking plates 24-28 and 36-40 may have either the same thickness, or may be of different thicknesses. In the embodiment of FIGS. 1 and 2, different thicknesses are used. For example, as can be seen in FIGS. 3, 4 and 5, the outboard blocking plates 24 and 36 each comprise seven disks, the middle blocking plates 26 and 38 each comprise five disks, and the inboard blocking plates 28 and 40 each comprise three disks. Thus, the thickness of the fixed blocking plates 24-28 and 36-40 decreases from the outboard end to the inboard end of each purge dam subassembly 18 and 30. This is because, the outboard ends of the purge dam subassemblies 18 and 30 experience higher air pressures than the inboard ends. One of the circular disks of each blocking plate may comprise a friction disk 52 having a plurality of flexible members 54 on its periphery (see FIG. 1). The flexible members 54 are adapted to flexibly engage an inside wall 46 or 48 of one of the first or second pipe ends 12 or 14, as can be seen in FIG. 2, such that the purge dam apparatus 2 is self-retaining in the pipe assembly 6. As used herein, the term "self-retaining" refers to the fact that no external retention components or materials, such as adhesive tape, glue, fasteners, etc., are required to retain the purge dam apparatus 2 in engagement with the pipe end inside walls. The desired self-retention property of the purge dam 2 apparatus is due to two factors. First, the diameter of friction disks 52 is somewhat larger than the inside diameter of the pipe ends 12 and 14. This forces the free ends of the flexible members 54 to bend when the purge dam apparatus 2 is installed. Second, the flexible members 54, as well as the remainder of the friction disks 52, are sufficiently stiff to develop radial forces between the flexible members 54 and the pipe end inside walls as the flexible members bend during purge dam installation. These radial forces in turn create longitudinal friction forces along the pipe end inside walls that oppose air or purge gas pressures that might otherwise displace the purge dam apparatus 2 in the longitudinal direction within the pipe ends 12 and 14. The flexible members 54 may be formed in various ways. In the illustrated embodiment of FIGS. 1 and 2, they comprise comprise flexible finger-shaped tabs defined by slits in the friction plate member periphery. The slits may be formed using any suitable technique, such as die cutting. Preferably, there are no appreciable gaps between the flexible members 54, such that bending the flexible members during purge dam installation does not allow an appreciable amount of purge gas to leave the weld zone 4 or air to enter the weld zone from within the pipes 8 and 10. It will be appreciated that other types of flexible members 54 may also be used.

With continuing reference to FIGS. 3, 4 and 5, the one or more blocking plates may additionally include one or more support disks 56 stacked on one or both sides of the friction disk 52. As can be seen in FIG. 1, the one or more support disks have a periphery that is aligned with a base of the friction disk flexible tabs 54. With the foregoing configuration, each of the fixed blocking plates 26-28 and 36-40 can respectively engage a inside wall 46 or 48 of one of the first and second pipe ends 12 and 14 with a tight friction fit. The cumulative effect of each fixed blocking plate's friction fit serves to retain the purge dam apparatus 2 in position within the pipe assembly 6 notwithstanding any high pressure bidirectional air flow surges that may be present therein. It will be appreciated that the pipe "gripping" capability of the purge dam apparatus 2 may be varied by increasing or decreasing the number of fixed blocking plates, with more blocking plates providing increased pipe wall retention to accommodate larger pressures and fewer blocking plates providing reduced pipe wall retention for lower pressures.

In the illustrated embodiment of FIGS. 1 and 2, the first, second and third conduits 20, 32 and 42 are configured to allow the spacing between the first and second purge dam subassemblies 18 and 30 to be adjusted during installation of the purge dam apparatus 2 in the pipe assembly 6. In particular, the first, second and third conduits 20, 32 and 42 may respectively comprise first, second and third tube members, with the third tube member being slidable within the first and second tube members. This will allow the spacing between the pipe ends 12 and 14 to be adjusted once the purge dam apparatus 2 is installed in the pipe assembly 6 as the root gap 16 is established.

As best shown in FIG. 2, respective sets of spacer members 58A-58D may be provided between the fixed blocking plates 24-28 of the first purge dam subassembly 18 and between the fixed blocking plates 36-40 of the second purge dam subassembly 30. The spacer members 58A-58D may be constructed as spacer conduits that are respectively concentrically mounted on the first and second conduits 20 and 32. A suitable water degradable adhesive may be disposed between the inside walls of the spacer members 58A-58D and the outside walls of the first and second conduits 20 and 32 in order to secure the spacer members. Similarly, the ends of the spacer members 58A-58D that abut against one of the fixed blocking plates 24-28 or 36-40 may be likewise be secured thereto using a water degradable adhesive.

Starting from the outboard end of each purge dam subassembly 18 and 30 in FIG. 2, a left-side spacer member 58A-1 extends between the outboard end of the first conduit 20 and the outboard side of the fixed blocking plate 24. A right-side spacer member 58A-2 extends between the outboard end of the second conduit 32 and the outboard side of the fixed blocking plate 36. Moving further inboard, a left-side spacer member 58B-1 is disposed between the inboard side of the fixed blocking plate 24 and the outboard side of the fixed blocking blocking plate 26. A right-side spacer member 58B-2 is disposed between the inboard side of the fixed blocking plate 36 and the outboard side of the fixed blocking blocking plate 38. Moving inboard again, a left-side spacer member 58C-1 is disposed between the inboard side of the fixed blocking plate 26 and the outboard side of the fixed blocking blocking plate 28. A right-side spacer member 58C-2 is disposed between the inboard side of the fixed blocking plate 38 and the outboard side of the fixed blocking blocking plate 40. Moving inboard a final time, a left-side spacer member 58D-1 is disposed on the inboard side of the fixed blocking plate 28 and the inboard end of the first conduit 20. A right-side spacer member 58D-2 is disposed on the inboard side of the fixed blocking plate 40 and the inboard end of the second conduit 32.

As additionally shown in FIG. 2, respective sets of structural reinforcing support members 60A and 60B may be provided between the fixed blocking plates 24-28 and 36-40. As can be seen in FIG. 1, the support members 60A and 60B may comprise box members that respectively surround the spacer members 58B and 58C on the first and second purge dam subassemblies 18 and 30. The ends of the support members 60A and 60B may be attached to the blocking plates that they respectively support using a water degradable adhesive. A left-side support member 60A-1 is disposed between the inboard side of the fixed blocking plate 24 and the outboard side of the fixed blocking plate 26. A right-side support member 60A-2 is disposed between the inboard side of the fixed blocking plate 36 and the outboard side of the fixed blocking plate 38. A left-side support member 60B-1 is disposed between the inboard side of the fixed blocking plate 26 and the outboard side of the fixed blocking plate 28. A right-side support member 60B-2 is disposed between the inboard side of the fixed blocking plate 38 and the outboard side of the fixed blocking plate 40.

In the illustrated embodiment of FIGS. 1 and 2, the inboard fixed blocking plates 28 and 40 respectively provided as part of the first and second purge dam subassemblies 18 and 30 each include an elongated sidewall member 62. Each sidewall member 62 is adapted to be adhered to an inside wall 46 or 48 of one of the pipe ends 12 or 14. The sidewall members 62 may be generally tubular or frustoconical in shape. They may be secured to the pipe ends 12 and 14 by applying a suitable water degradable adhesive tape or liquid adhesive or glue (not shown) at the job site. Alternatively, a water degradable adhesive may be pre-applied to the outer surface of the sidewall members 62 during manufacture of the purge dam apparatus 2. In that case, the pre-applied adhesive may be covered by an adhesive backing (not shown) that is removed immediately prior to purge dam installation. The sidewall members 62 of the inboard fixed blocking plates 28 and 40 may be used to provide primary purge gas seals that define the ends of the weld zone 4.

As can be seen in FIGS. 1 and 2, the first and second purge dam subassemblies may each respectively include an optional floating blocking plate 64 and 66 that is adjustably positionable on the first and second conduits 18 and 30. The floating blocking plates 64 and 66 may be constructed with one or more generally circular disks having a central opening that is larger than the central openings of the fixed blocking plates 24-28 and 36-40. In particular, the central openings of the floating blocking plates 64 and 66 may be sized so that the floating plates are capable of sliding over the spacer members 58D-1 and 58D-2, respectively. Each floating blocking plate 64 and 66 includes one of the friction disks 52 (with flexible members 54) found in the fixed blocking plates 24-28 and 36-40, as well as one or more of the support disks 56. For example, each floating blocking plates 64 and 66 may have two support disks 56, one on each side of the friction disk 52. Thus, the floating blocking plates 64 and 66 may be similar in construction to the fixed blocking plates 28 and 40, except without the sidewall members 62.

As shown in the illustrated embodiment of FIGS. 1 and 2, a heat shield 68 may also be provided to cover adjacent end portions of the first and second conduits 20 and 32 (as well as the ends of the spacer members 58D-1 and 58D-2) when the purge dam apparatus 2 is installed in the pipe assembly 6. The heat shield 68 is formed from a suitable heat resistant material, such as a ceramic, and serves to protect the water degradable purge dam components that are directly below the root gap 16 from welding heat.

Figure 6:
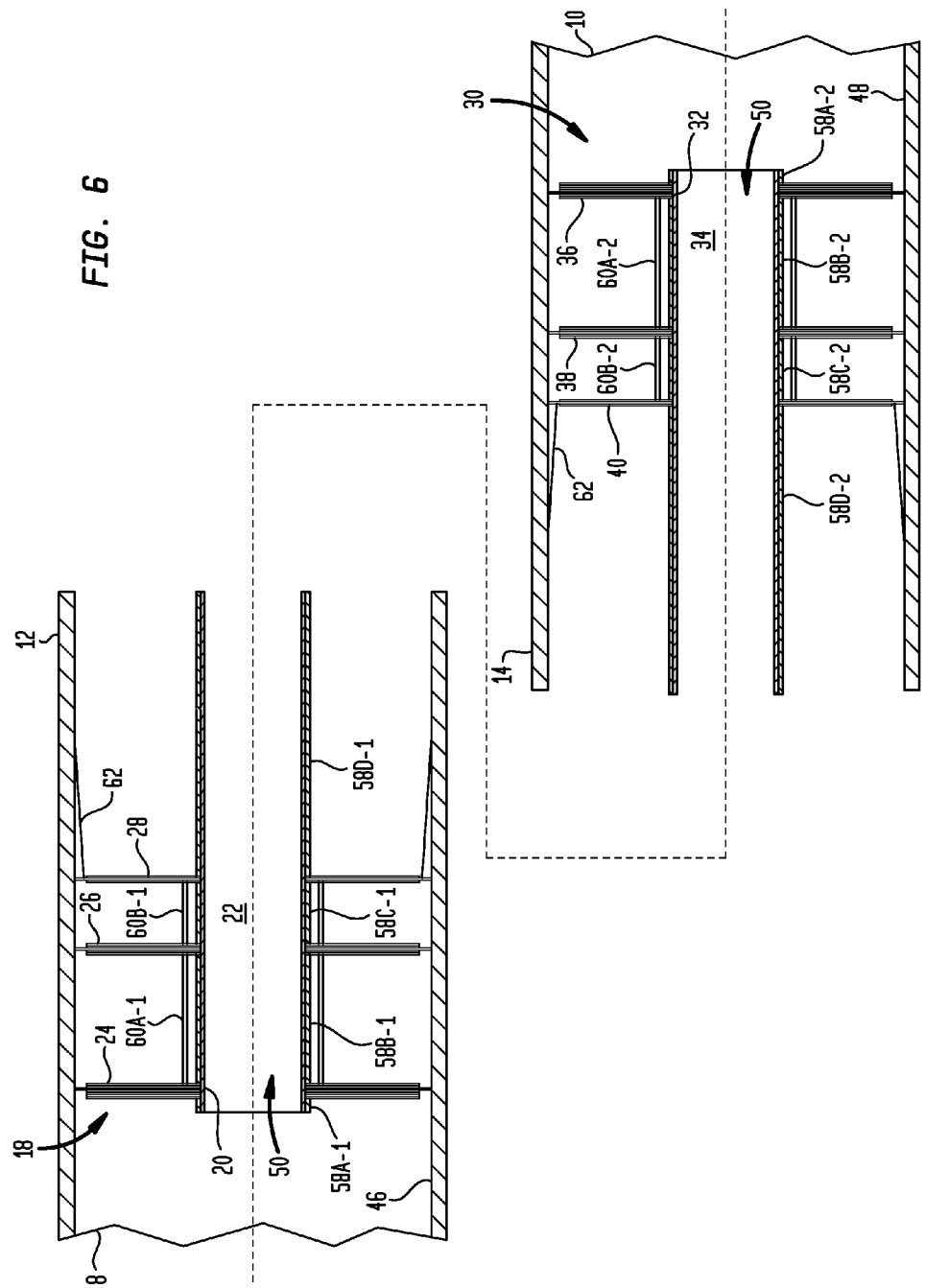
FIG. 6 is a cross-sectional centerline view the purge dam apparatus of FIG. 1 in a first installation stage.
Figure 7:
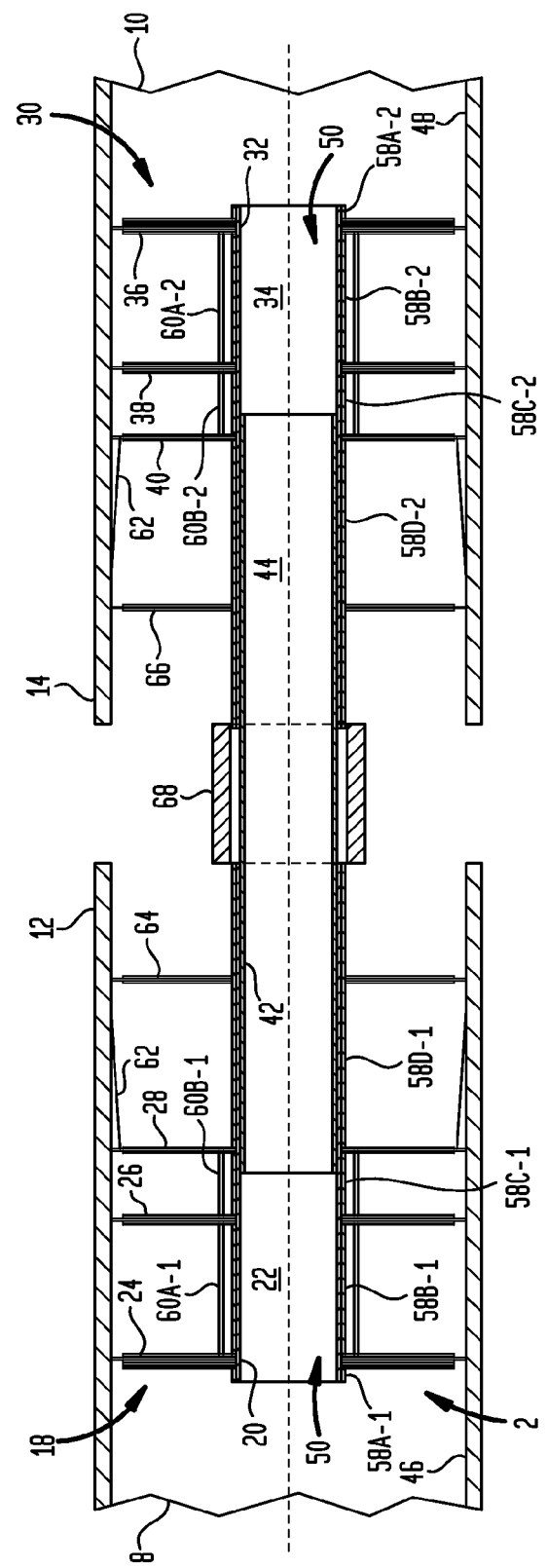
FIG. 7 is a cross-sectional centerline view the purge dam apparatus of FIG. 1 in a second installation stage.

Turning now to FIGS. 6 and 7, installation of the purge dam apparatus 2 in the pipe assembly 6 may be performed using the installation method now to be described. As shown in FIG. 6, the pipes 8 and 10 are initially separated a considerable distance so that each of the purge dam subassemblies 18 and 30 may be respectively introduced into the pipe ends 12 and 14. Note that the fixed blocking disks 24-28 and 36-40 may fit sufficiently tightly within the pipe ends 12 and 14, respectively, as to require that the purge dam subassemblies 18 and 30 be pounded into the pipe ends by applying a striking force against the ends of the first and second conduits 20 and 32. The purge dam subassemblies 18 and 30 are preferably positioned so that the inboard ends of the first and second conduits 20 and 32, as well as the inboard ends of spacer members 58D-1 and 58D-2, do not extend substantially beyond the pipe ends 12 and 14, respectively. Otherwise, it may not be possible to bring the pipe ends 12 and 14 close enough together to form the root gap 16.

Once the purge dam subassemblies 18 and 30 are respectively installed in the pipe ends 12 and 14, the sidewalls 62 on the fixed blocking plates 28 and 40 may be respectively secured to the pipe end inside walls 46 and 48. As mentioned above, adhesive tape, glue, or a pre-applied adhesive coating on the sidewalls 62, may be used for this purpose. If the floating blocking plates 64 and 66 are used, they may now be respectively pushed into the pipe ends 12 and 14 and until they are positioned at a desired distance from the pipe end entrances. This distance will help establish the size of the weld zone 4 insofar as the floating blocking plates 64 and 66 will serve as initial purge gas retaining members, with final purge gas retention being provided by the fixed blocking plates 28 and 40.

After sliding the heat shield 68 onto the third conduit 42, the left-hand and right-hand ends of the third conduit may be respectively inserted into the inboard ends of the first and second conduits 20 and 32, in order to interconnect the conduits. Note that this operation may require bringing the pipe ends 12 and 14 closer together toward the spacing position shown in FIG. 7. As the FIG. 7 position is reached, the heat shield 68 can be lifted to align it with the inboard ends of the first and second conduits 20 and 32, and with the spacing members 58D-1 and 58D-2 respectively mounted thereon. Once the foregoing components enter the ends of the heat shield 68, the pipe ends 12 and 14 may be brought together into the weld zone purging installation configuration of FIG. 2, in which the weld zone 4 and root gap 16 are formed and the pipe ends are ready for welding.

To reiterate, in the weld zone purging installation configuration of FIG. 2, the first purge dam subassembly 18 is arranged inside the first pipe end 12, the second purge dam subassembly 30 is arranged inside the second pipe end 14, and the third conduit 42 is interconnected to the first and second conduits so as to span the root gap 16 of the pipe assembly 6. The fixed blocking plates 24-28 and 36-40 of the first and second purge dam assemblies 18 and 30, as well as the floating blocking plates 64 and 66, if present, respectively engage the inside walls 46 and 48 of the first and second pipe ends 12 and 14. Purge gas introduced through the root gap 16 will thus be retained in the weld zone 4, and pressurized air will be prevented from entering the weld zone from the first and second pipes 8 and 10. At the same time, the first, second and third air flow pathways 22, 34 and 44 will allow the pressurized air within the pipes 8 and 10 to pass through the purge dam apparatus 2, and thus through the weld zone 4, within the sequestered by-pass zone 50 defined by the conduits 20, 32 and 42.

Once the pipe ends 12 and 14 are fully welded together at the root gap 16, the purge dam apparatus 2 may be conveniently removed from the pipe assembly 6 using a water-based material passed through the pipes 8 and 10. For example, the pipe assembly 6 may be flushed with water to degrade the purge dam assembly 2, so that it breaks apart and flows along the pipes to an exit point, which is typically a non-welded end of one of the pipes 8 or 10. For some water-degradable materials, such as water soluble paper and/or polymer laminates, the purge dam assembly 2 may completely dissolve as a result of such flushing.

Figure 8:
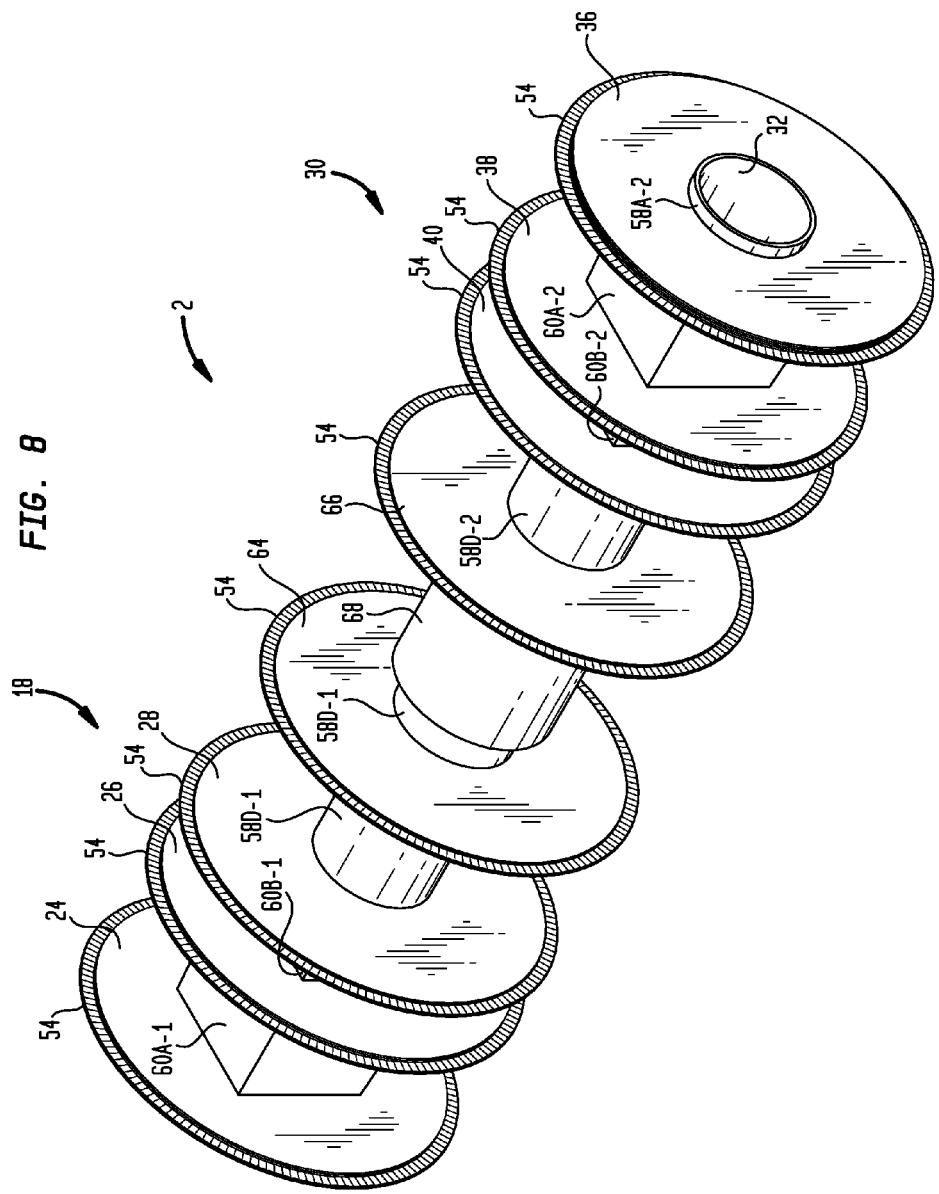
FIG. 8 is a perspective showing a water-degradable purge dam apparatus constructed in accordance another embodiment with the present disclosure.

Turning now to FIG. 8, an alternate embodiment of the purge dam apparatus 2 is shown. In this embodiment, the sidewalls 62 have been removed from the fixed blocking plates 28 and 40. The floating blocking plates 28 and 40 will still provide initial purge gas retention, with additional retention being provided by the fixed blocking plates 28 and 40, albeit without the sidewalls 62.

Figure 9:
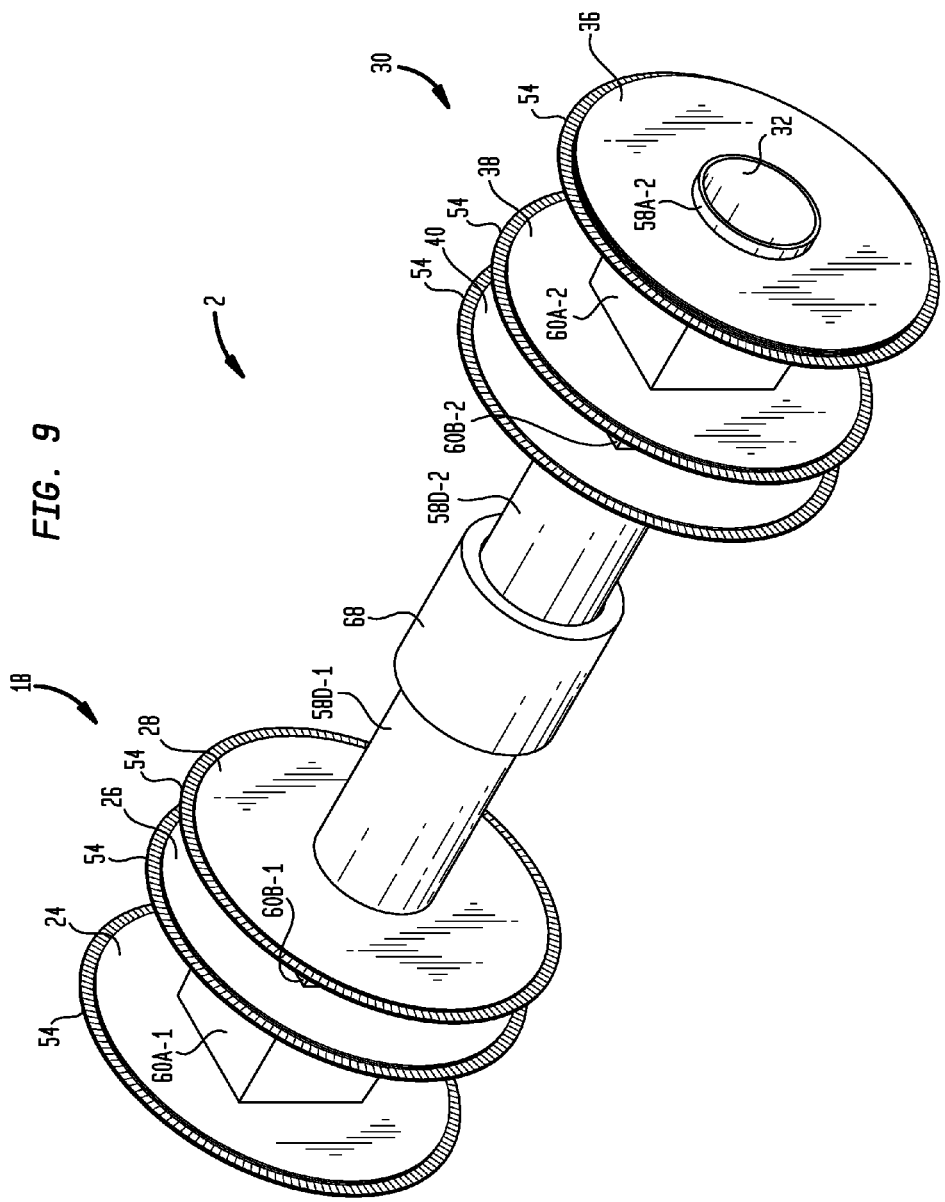
FIG. 9 is a perspective showing a water-degradable purge dam apparatus constructed in accordance a further embodiment with the present disclosure.

Turning now to FIG. 9, another alternate embodiment of the purge dam apparatus 2 is shown. In this embodiment, the floating blocking plates 64 and 66 have been eliminated, and the sidewalls 62 have been removed from the fixed blocking plates 28 and 40. This arrangement may be used for welding operations that do not require purging, but do require that the air flow within the pipes 8 and 10 be blocked. This embodiment could be further modified to eliminate some of the fixed blocking plates 24-28 and 36-40, or to add additional blocking plates.

Figure 10:
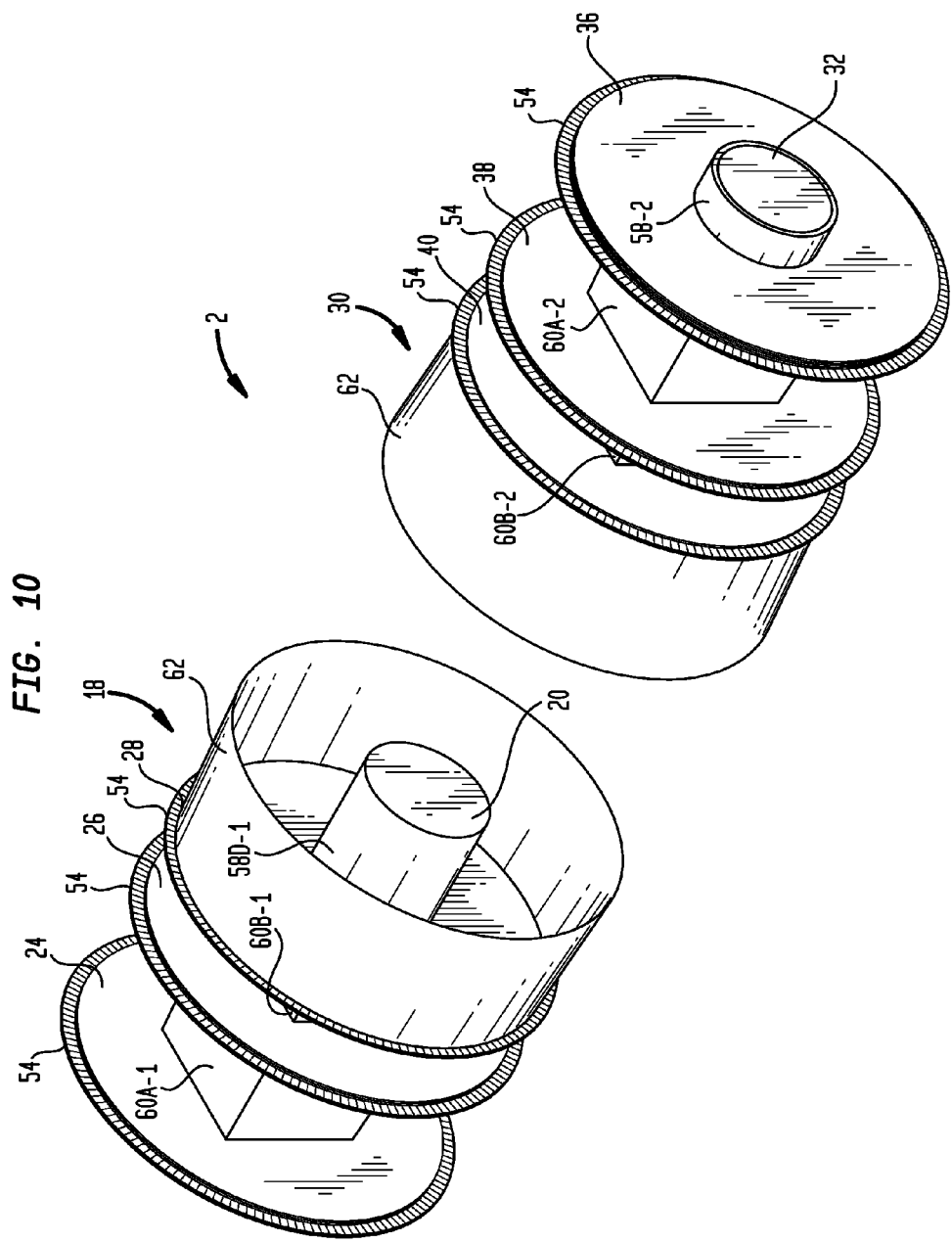
FIG. 10 is a perspective view showing a water-degradable purge dam apparatus constructed in accordance a further embodiment with the present disclosure.
Figure 11:
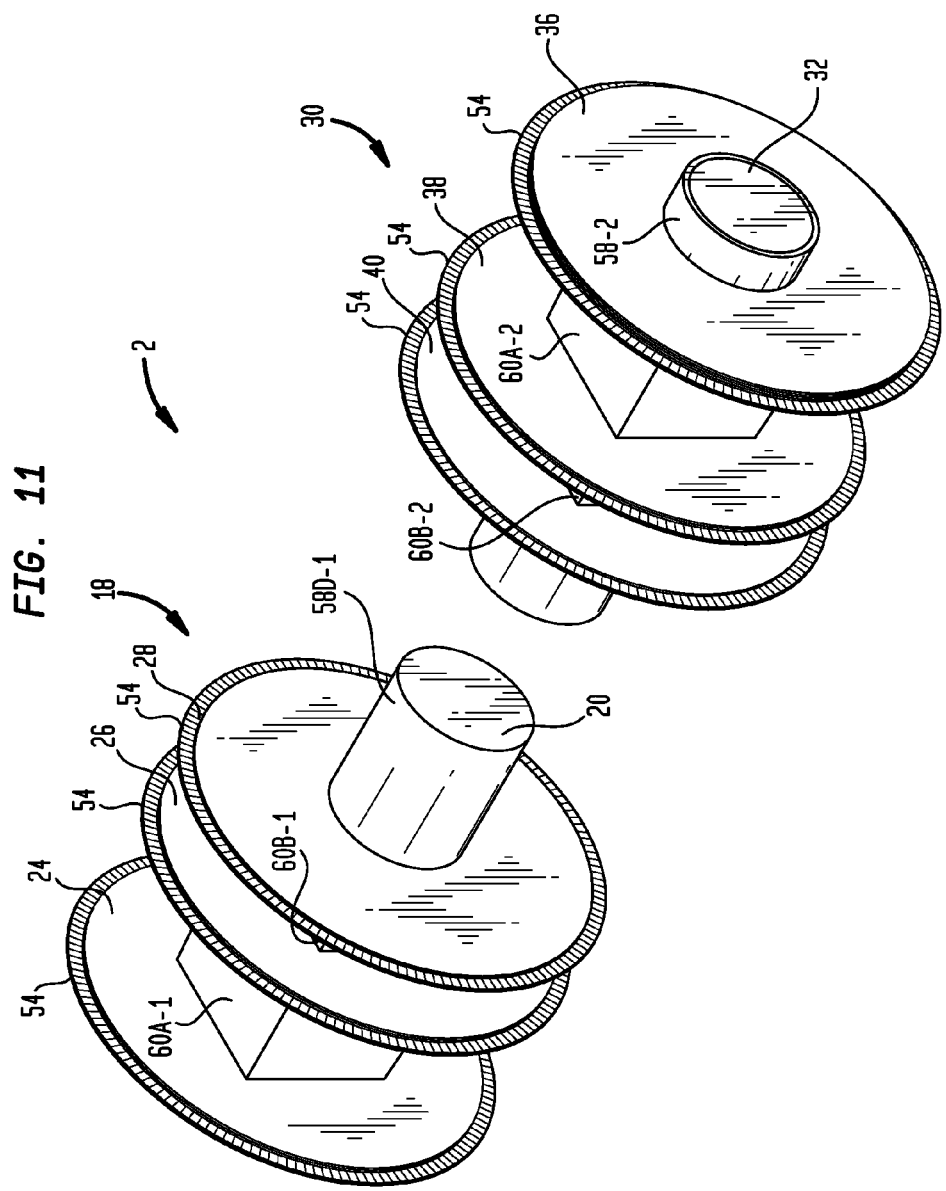
FIG. 11 is a perspective view showing a water-degradable purge dam apparatus constructed in accordance a further embodiment with the present disclosure.

Turning now to FIGS. 10 and 11, two further alternate embodiments of the purge dam apparatus 2 are shown. In these embodiments, the first and second purge dam subassemblies 18 and 30 are not interconnected because the third conduit 42 is not present. Nor do the first and second subassemblies 18 and 30 have hollow air pathways to pass air therethrough. Nor does any air pass through the weld zone 4 from one pipe another. Instead, the respective first and second conduits 20 and 32 that were present in previous embodiments are solid connecting members that simply join together the various blocking plates 24-28 and 36-40 of the first and second purge dam subassemblies 18 and 30 as sets of ganged air flow blocking plates. Other blocking plate connection arrangements could also be used. Because there is no sequestered by-pass zone 50 to pass air through the weld zone 4, this embodiment is suitable for use in pipe assemblies that have relatively low air pressures within the pipes. In both of FIGS. 10 and 11, there are no floating blocking plates 64 and 66, although such could be added if desired. In FIG. 11, the sidewalls 62 have been removed from the fixed blocking plates 28 and 40.

Accordingly, a water-degradable purge dam apparatus, together with a related method and a weld zone purging installation, have been disclosed. While various embodiments have been described, it should be apparent that many variations and alternative embodiments could be implemented in accordance with the invention. For example, the number of fixed and floating blocking plates used in the purge dam apparatus 2 is a matter of design choice. In alternate embodiments and constructions, fixed and floating blocking plates may be added or removed, as desired. It is understood, therefore, that the invention is not to be in any way limited except in accordance with the spirit of the appended claims and their equivalents.

What is claimed is:

1. A water-degradable welding purge dam apparatus for purging a weld zone of a pipe assembly comprising first and second pipes having respective first and second ends to be welded together at a root gap, said purge dam apparatus comprising:

a first purge dam subassembly having a hollow first conduit defining a first air flow pathway therethrough and having one or more air flow blocking plates fixedly mounted on said first conduit;

a second purge dam subassembly having a hollow second conduit defining a second air flow pathway therethrough, and one or more air flow blocking plates fixedly mounted on said second conduit;

a hollow third conduit defining a third air flow pathway therethrough, said third conduit being interconnectable to said first and second conduits members;

said purge dam apparatus being installable in said pipe assembly such that:

(1) said first purge dam subassembly is arranged inside said first pipe end, said second purge dam subassembly is arranged inside said second pipe end, and said third conduit is interconnected to said first and second conduit and spans said root gap;

(2) said one or more blocking plates of said first and second purge dam assemblies respectively engage inside walls of said first and second pipe ends in order to retain a purge gas in said weld zone and to prevent air from entering said weld zone from said first and second pipes; and (3) said first, second and third air flow pathways allow pressurized air within said pipes to pass through said purge dam apparatus and said weld zone in a sequestered by-pass zone defined by said first, second and third conduits; and said purge dam apparatus comprising one or more water degradable materials so that it can be flushed from said pipe assembly following welding.

2. The purge dam apparatus of claim 1, wherein said one or more blocking plates each comprise one or more generally circular disks having a central opening that receives one of said first or second conduits.

3. The purge dam apparatus of claim 1, wherein said one or more blocking plates each comprise a friction disk having a plurality of flexible sidewall members on its periphery adapted to flexibly engage an inside wall of one of said first or second pipe ends.

4. The purge dam apparatus of claim 3, wherein said flexible members comprise flexible tabs defined by slits in said disk periphery.

5. The purge dam apparatus of claim 4, wherein said one or more blocking plates additionally include one or more support disks stacked on one or both sides of said friction disk.

6. The purge dam apparatus of claim 5, wherein said one or more support disks have a periphery that is aligned with a base of said friction disk flexible tabs.

7. The purge dam apparatus of claim 1, wherein said first, second and third conduits are configured to allow a spacing between said first and second purge dam subassemblies to be adjusted during installation of said welding purge dam apparatus in said pipe assembly.

8. The purge dam apparatus of claim 7, wherein said first, second and third conduits respectively comprise first, second and third tube members, said third tube member being slidable within said first and second tube members.

9. The purge dam apparatus of claim 1, further including spacer members between said one or more blocking plates.

10. The purge dam apparatus of claim 9, wherein spacer members comprise spacer conduits mounted on said first and second conduits.

11. The purge dam apparatus of claim 1, further including support members between said one or more blocking plates.

12. The purge dam apparatus of claim 11, wherein said support members comprise box members.

13. The purge dam apparatus of claim 1, wherein said first and second subassemblies each have a primary blocking plate that includes an elongated sidewall member adapted to be adhered to an inside wall of one of said pipe ends.

14. The purge dam apparatus of claim 1, wherein said first and second subassemblies each further include a floating blocking plate that is adjustably positionable on said first or second conduits.

15. The purge dam apparatus of claim 1, further including a heat shield that is configured to cover adjacent end portions of said first and second conduits when said purge dam apparatus is installed in said pipe assembly.

16. A method for installing a water-degradable purge dam apparatus in a weld zone of a pipe assembly comprising first and second pipes having respective first and second ends to be welded together at a root gap, said method comprising:
   providing a water-degradable purge dam, comprising:
      a first purge dam subassembly having a hollow first conduit defining a first air flow pathway therethrough and having one or more air flow blocking plates fixedly mounted on said first conduit;
      a second purge dam subassembly having a hollow second conduit defining a second air flow pathway therethrough, and one or more air flow blocking plates fixedly mounted on said second conduit;
      a hollow third conduit defining a third air flow pathway therethrough, said third conduit being interconnectable to said first and second conduits members;
   said purge dam apparatus comprising one or more water degradable materials so that it can be flushed from said pipe assembly following welding;
   installing said purge dam apparatus in said pipe assembly such that:
      (1) said first purge dam subassembly is arranged inside said first pipe end, said second purge dam subassembly is arranged inside said second pipe end, and said third conduit is interconnected to said first and second conduit and spans said root gap;
      (2) said one or more blocking plates of said first and second purge dam assemblies respectively engage inside walls of said first and second pipe ends in order to retain a purge gas in said weld zone and to prevent air from entering said weld zone from said first and second pipes; and
      (3) said first, second and third air flow pathways allow pressurized air within said pipes to pass through said purge dam apparatus and said weld zone in a sequestered by-pass zone defined by said first, second and third conduits.

17. The method of claim 16, wherein said first purge dam subassembly and said second purge dam subassembly are respectively installed in said first and second pipe ends when said pipe ends are substantially spaced from each other allow said installation, said pipe ends being thereafter brought closer together until said third conduit can be interconnected to said first and second conduits, said pipe ends being thereafter brought still closer together until said root gap is formed.

18. The method of claim 17, wherein a heat shield is placed over said third conduit prior to said third conduit being interconnected to said first and third conduits, said heat shield being long enough to cover adjacent ends of said first and second conduits when said root gap is formed.

19. The method of claim 16, further a deinstallation operation in which an aqueous material is used to flush said purge dam apparatus from said pipe assembly following said welding.

20. A water-degradable welding purge dam apparatus for purging a weld zone of a pipe assembly comprising first and second pipes having respective first and second ends to be welded together at a root gap, said purge dam apparatus comprising:
   a first purge dam subassembly having a hollow first conduit defining a first air flow pathway therethrough and having one or more air flow blocking plates fixedly mounted on said first conduit;
   a second purge dam subassembly having a hollow second conduit defining a second air flow pathway therethrough, and one or more air flow blocking plates fixedly mounted on said second conduit;
   a hollow third conduit defining a third air flow pathway therethrough, said third conduit being interconnectable to said first and second conduits members;
   said purge dam apparatus being installable in said pipe assembly such that:
      (1) said first purge dam subassembly is arranged inside said first pipe end, said second purge dam subassembly is arranged inside said second pipe end, and said third conduit is interconnected to said first and second conduit and spans said root gap;
      (2) said one or more blocking plates of said first and second purge dam assemblies respectively engage inside walls of said first and second pipe ends in order to retain a purge gas in said weld zone and to prevent air from entering said weld zone from said first and second pipes; and
      (3) said first, second and third air flow pathways allow pressurized air within said pipes to pass through said purge dam apparatus and said weld zone in a sequestered by-pass zone defined by said first, second and third conduits;
   said purge dam apparatus comprising one or more water degradable materials so that it can be flushed from said pipe assembly following welding;
   said one or more blocking plates comprise each comprising one or more generally circular disks having a central opening that receives one of said first or second conduits;
   said one or more blocking plates each comprising a friction disk having a plurality of flexible members on its periphery adapted to flexibly engage an inside wall of one of said first or second pipe ends;
   said flexible members comprising flexible tabs defined by slits in said disk periphery;
   said one or more blocking plates additionally including one or more support disks stacked on one or both sides of said friction disk;
   said one or more support disks having a periphery that is aligned with a base of said friction disk flexible tabs;
   said first, second and third conduits being configured to allow a spacing between said first and second purge dam subassemblies to be adjusted during installation of said welding purge dam apparatus in said pipe assembly;
   said first, second and third conduits respectively comprising first, second and third tube members, said third tube member being slidable within said first and second tube members;
   spacer members between said one or more blocking plates, said spacer members comprising spacer conduits mounted on said first and second conduits;
   support members between said one or more blocking plates, said support members comprising box members;
   said first and second subassemblies each having a primary blocking plate that includes an elongated sidewall member adapted to be adhered to an inside wall of one of said pipe ends;

said first and second subassemblies each further including a floating blocking plate that is adjustably positionable on said first or second conduits; and a heat shield that is configured to cover adjacent end portions of said first and second conduits when said purge dam apparatus is installed in said pipe assembly.

21. A weld zone purging installation for purging a weld zone of a pipe assembly comprising first and second pipes having respective first and second ends to be welded together at a root gap, said purge dam welding assembly comprising:

said pipe assembly including said first pipe and said second pipe;

said first pipe end and said second pipe end being spaced from each other to form said root gap;

a water-degradable purge dam apparatus including:

a first purge dam subassembly having a hollow first conduit defining a first air flow pathway therethrough and having one or more air flow blocking plates fixedly mounted on said first conduit;

a second purge dam subassembly having a hollow second conduit defining a second air flow pathway therethrough, and one or more air flow blocking plates fixedly mounted on said second conduit;

a hollow third conduit defining a third air flow pathway therethrough, said third conduit being interconnected to said first and second conduits members;

said purge dam apparatus being installed in said pipe assembly such that:

(1) said first purge dam subassembly is arranged inside said first pipe end, said second purge dam subassembly is arranged inside said second pipe end, and said third conduit is interconnected to said first and second conduit and spans said root gap;

(2) said one or more blocking plates of said first and second purge dam assemblies respectively engage inside walls of said first and second pipe ends in order to retain a purge gas in said weld zone and to prevent air from entering said weld zone from said first and second pipes; and (3) said first, second and third air flow pathways allow pressurized air within said pipes to pass through said purge dam apparatus and said weld zone in a sequestered by-pass zone defined by said first, second and third conduits; and said purge dam apparatus comprising one or more water degradable materials so that it can be flushed from said pipe assembly following welding.

22. A water-degradable welding purge dam apparatus for purging a weld zone of a pipe assembly comprising first and second pipes having respective first and second ends to be welded together at a root gap, said purge dam apparatus comprising:

a first purge dam subassembly having a ganged set of two or more spaced apart air flow blocking plates;

a second purge dam subassembly having a ganged set of two or more spaced apart air flow blocking plates;

said purge dam apparatus being installable in said pipe assembly such that:

(1) said first purge dam subassembly is arranged inside said first pipe end and said second purge dam subassembly is arranged inside said second pipe end; and (2) said one or more blocking plates of said first and second purge dam assemblies respectively engage inside walls of said first and second pipe ends in order to retain a purge gas in said weld zone and to prevent air from entering said weld zone from said first and second pipes; and said purge dam apparatus comprising one or more water degradable materials so that it can be flushed from said pipe assembly following welding, including said air flow blocking plates of said first and second first and second purge dam subassemblies each comprising a laminate having two or more substantially planar layers of water-soluble paper, said air flow blocking plates having respective central portions joined together by a common connecting member, and having respective peripheral portions that are free-standing and unattached to each other.

* * * * *